UNITED STATES PATENT OFFICE.

LAURENCE ELKUS, OF INDIANAPOLIS, INDIANA.

COMPOSITE BRICK.

No. 837,290.     Specification of Letters Patent.     Patented Dec. 4, 1906.

Application filed May 17, 1906. Serial No. 317,320.

*To all whom it may concern:*

Be it known that I, LAURENCE ELKUS, of Indianapolis, county of Marion, and State of Indiana, have invented a certain new and useful Composite Brick; and I do hereby declare that the following is a full, clear, and exact description thereof.

The object of this invention is to provide a new brick for building purposes and one that is stronger, possesses a greater power of resistance to compression, has its particles more tenaciously bound together, and is otherwise better than building-bricks heretofore manufactured.

The nature of the invention will be understood from the following description and claim.

This composite brick is composed of about two per cent. of calcined gypsum, five per cent. of cement, ten per cent. of hydrated lime, and eighty-three per cent. of sand; but I do not wish to be limited to these exact proportions, as the percentage of each ingredient may be varied within reasonable limits.

The brick is formed in the following manner: The sand is first dried and screened, the lime is pulverized and hydrated, and the cement and calcined gypsum are also pulverized. Then all of the ingredients are mixed dry, preferably in a revolving cylinder, in substantially the proportions indicated. Moisture is then sprayed on the dry mixture while it is being further mixed, and it is afterward fed into the molds of a proper brick size and subjected to a pressure of about seventy-five tons to a brick. The bricks are then laid upon cars or the like and conveyed into a cylinder or other steam-tight compartment and indurated by steam at high pressure, which causes them to solidify and crystallize into exceedingly-hard and durable bricks.

What I claim as my invention, and desire to secure by Letters Patent, is—

A brick composed of substantially two per cent. of calcined gypsum, five per cent. of cement, ten per cent. of hydrated lime, and eighty-three per cent. of sand and the like, substantially as set forth.

In witness whereof I have hereunto affixed my signature in the presence of the witnesses herein named.

LAURENCE ELKUS.

Witnesses:
W. M. GENTLE,
N. ALLEMONG.